(12) United States Patent
Peng et al.

(10) Patent No.: US 8,427,126 B2  
(45) Date of Patent: Apr. 23, 2013

(54) DIGITAL CONTROL OF PWM CONVERTERS WITH NONLINEAR GAIN SCHEDULING

(75) Inventors: Hao Peng, Sunnyvale, CA (US); Chin Chang, Agoura Hills, CA (US)

(73) Assignee: Semtech Corporation, Camarillo, CA (US)

( * ) Notice: Subject to any disclaimer, the term of this patent is extended or adjusted under 35 U.S.C. 154(b) by 486 days.

(21) Appl. No.: 12/627,912

(22) Filed: Nov. 30, 2009

(65) Prior Publication Data

US 2011/0127983 A1   Jun. 2, 2011

(51) Int. Cl.  
*G05F 1/575* (2006.01)

(52) U.S. Cl.  
USPC .......................................... 323/283; 323/284

(58) Field of Classification Search .............. 323/282, 323/283, 284, 285; 363/21.05, 21.13  
See application file for complete search history.

(56) References Cited

U.S. PATENT DOCUMENTS

| | | | |
|---|---|---|---|
| 6,075,351 A * | 6/2000 | Benes | 323/280 |
| 7,239,257 B1 * | 7/2007 | Alexander et al. | 341/138 |
| 8,036,762 B1 * | 10/2011 | Young et al. | 700/37 |
| 2004/0189272 A1 * | 9/2004 | Matsuura et al. | 323/283 |
| 2006/0139109 A1 * | 6/2006 | Oustaloup et al. | 331/17 |
| 2006/0220625 A1 * | 10/2006 | Chapuis | 323/282 |
| 2008/0157737 A1 * | 7/2008 | Chang et al. | 323/282 |
| 2010/0207594 A1 * | 8/2010 | Davoudi et al. | 323/283 |
| 2011/0043186 A1 * | 2/2011 | Bech et al. | 323/364 |

OTHER PUBLICATIONS

Patella, B.J.; Prodic, A.; Zirger, A.; Maksimovic, D., "High-frequency digital PWM controller IC for DC-DC converters," Power Electronics, IEEE Transactions on, vol. 18, No. 1, pp. 438-446, Jan. 2003 doi: 10.1109/TPEL.2002.807121 URL: http://ieeexplore.ieee.org/stamp/stamp.jsp?tp=&arnumber=1187463&isnumber=26626.*

* cited by examiner

*Primary Examiner* — Adolf Berhane  
*Assistant Examiner* — Fred E Finch, III  
(74) *Attorney, Agent, or Firm* — O'Melveny & Myers LLP

(57) ABSTRACT

A system and method for controlling a digital pulse-width modulated power converter achieves a fast large-signal transient response while maintaining a slow response near the steady-state operating point in order to assure stability and to reduce the system's susceptibility to noise. Digital output error samples are processed through a gain scheduling block that applies a non-linear gain function to produce a weak loop response when the system is near its steady-state equilibrium point and a strong loop response when large transients are encountered. The resulting system maintains a fast transient response to large error signals while reducing noise and loop jittering and assuring loop stability.

19 Claims, 8 Drawing Sheets

DIGITAL CONTROL OF PWM CONVERTERS WITH NONLINEAR GAIN SCHEDULING

BACKGROUND OF THE INVENTION

1. Field of the Invention

The invention relates generally to the field of power converters controlled through digital pulse-width modulation (PWM). More particularly, the invention relates to a digital control scheme for PWM converters that uses non-linear gain scheduling to achieve a fast transient response while maintaining a slow response near the equilibrium point to ensure stability and reduce sensitivity to noise.

2. Description of Related Art

The use of digital pulse width modulation (DPWM) to control the output of a switching power converter is well known in the art. For example, FIG. 1 depicts a block diagram of a typical power conversion system in which the output 104 of a power stage 102 is controlled by a DPWM module 114. An error circuit 108 computes a difference between the output 104 of the power stage and a reference voltage 106. The error signal is digitized by an analog-to-digital converter (ADC) 110. The ADC output is filtered by a compensator circuit 112 that generally has a proportional-integral-differential (PID) character. The output of the compensator filter 112 then drives a digital pulse width modulator 114 that controls the switching cycles of the power stage 102.

One of the challenges faced by power converter designers is providing a fast response time while maintaining system stability against oscillation and minimizing overshoot. To address this issue, some designers employ non-linear methods. For example, FIG. 2 illustrates a non-linear control approach taken by some designers that comprises introducing a window comparator circuit 202 in parallel with the compensator filter 112. For small transients, the output of the compensator filter passes essentially unmodified to the DPWM for normal linear control operation. But when a large transient occurs, the window comparator 202 will notify the DPWM controller 114, which may make a decision to respond immediately before the end of the current switching cycle. While such a method may provide a fast transient response, it is essentially a hysteretic control approach, which makes it susceptible to stability problems. Accordingly, it would be desirable to provide a non-linear control approach that maintains a fast transient response while also suppressing oscillation and jittering around the steady state operating point.

SUMMARY OF THE INVENTION

An embodiment of a digital pulse-width modulation (DPWM) control system in accordance with the present invention includes a power stage comprising an input voltage port, an output voltage port, and an input control port configured to receive a DPWM control waveform. The voltage output from the output voltage port of the power stage is routed to an error sampling block that comprises an analog-to-digital converter (ADC) and an error comparison circuit. The output of the error sampling block is a digital error signal that is related to the difference between the power stage output voltage and a reference voltage. The digital error signal is then routed to a gain scheduling block that applies a non-linear gain function to the digital error signal. Non-linearity of the gain function means that the gain response as a function of the amplitude of the input digital error signal cannot be described by a straight line having a single, constant slope. In one embodiment, the non-linear gain function has a profile that increases slowly as a function of input amplitude for error signal magnitudes that are small. It then increases quickly (with a steeper slope) as a function of input amplitude for error magnitudes that lie in a medium range. It then increases slowly (with a shallower slope) with input amplitude for error magnitudes that are relatively large.

Upon exiting the gain scheduling block, the gain-scheduled error signal is routed to a compensator filter. The compensator filter preferably has a proportional-integral-differential (PID) characteristic, although filters having other characteristics would also fall within the scope and spirit of the present invention. The filtered signal is then used to drive a DPWM module that synthesizes a DPWM control waveform that is operatively coupled to the input control port of the power stage. The closed-loop DPWM control system thus acts to maintain the output voltage of the power stage near the reference voltage.

In one embodiment of a DPWM control system in accordance with the present invention, the error sampling block is configured to first digitize the output voltage of the power stage in the ADC and then to subtract a digital reference voltage sample to create the digital error signal. In another embodiment, the error sampling block is configured to first subtract an analog reference voltage from the output voltage of the power stage to create a difference voltage. The difference voltage is then digitized by the analog-to-digital converter to create a digital error signal. Other methods of preparing digital error samples that are related to the difference between the power stage output and a reference voltage are possible and would also fall within the scope and spirit of the present invention.

The power stage is preferably a switching power converter such as a buck converter or a boost converter, having an internal switching element such as a field-effect transistor (FET), and an output filter that generally comprises at least one capacitor and at least one inductor. The internal switching element operates to selectively connect the input voltage port to the output filter to produce an output voltage that is related to the duty cycle of the switching element. However, other types of power stages that can be controlled using pulse width modulation may also be used and would similarly fall within the scope and spirit of the present invention.

In one embodiment of a DPWM control system in accordance with the present invention, the gain scheduling block is configured to apply a non-linear gain function that is a piece-wise linear function of input amplitude. The piece-wise linear function includes a first linear portion having a slope of $\alpha 1$ for input amplitudes less than a1, where $\alpha 1$ and a1 are real numbers. For input amplitudes between and including a1 and a2, where a2 is greater than a1, the piece-wise linear function has a slope of $\alpha 2$. Then for input amplitudes greater than a2, the piece-wise linear function has a slope of $\alpha 3$. Both slopes $\alpha 1$ and $\alpha 3$ are less than slope $\alpha 2$.

In another embodiment of a DPWM control system in accordance with the present invention, the gain scheduling block is configured to apply a piece-wise linear gain function that applies a gain of zero for input amplitudes less than a1 and a gain with a slope of $\alpha 1$ for input amplitudes greater than or equal to a1.

In still another embodiment, the gain scheduling block is configured to apply a piece-wise linear gain function that applies a gain with a slope of $\alpha 1$ for input amplitudes less than a1 and a flat (zero-slope) gain of $\alpha 1 * a1$ for input amplitudes greater than or equal to a1.

In some embodiments, the compensator filter is configured to have a response function given by $d[n]=d[n-1]+b0*e[n]-b1*e[n-1]+b2*e[n-2]$, where $d[n]$ is an output of the compensator filter at a current sample time t; d[n−1] is the output of the compensator filter at the sample time t−1; e[n] is the gain-scheduled error signal at the current sample time t; e[n−1] is the gain-scheduled error signal at the sample time t−1; e[n−2] is the gain-scheduled error signal at a sample time t−2; and b0, b1, and b2 are filter coefficients. In some embodiments, the filter coefficients may be programmable.

Those skilled in the art will realize other applications and benefits of the invention described herein by a study of the detailed description below and the attached drawings, which will first be described briefly. Reference designators that appear in more than one drawing refer to common elements that appear in more than one drawing.

DETAILED DESCRIPTION OF THE PREFERRED EMBODIMENT

Figure 1:
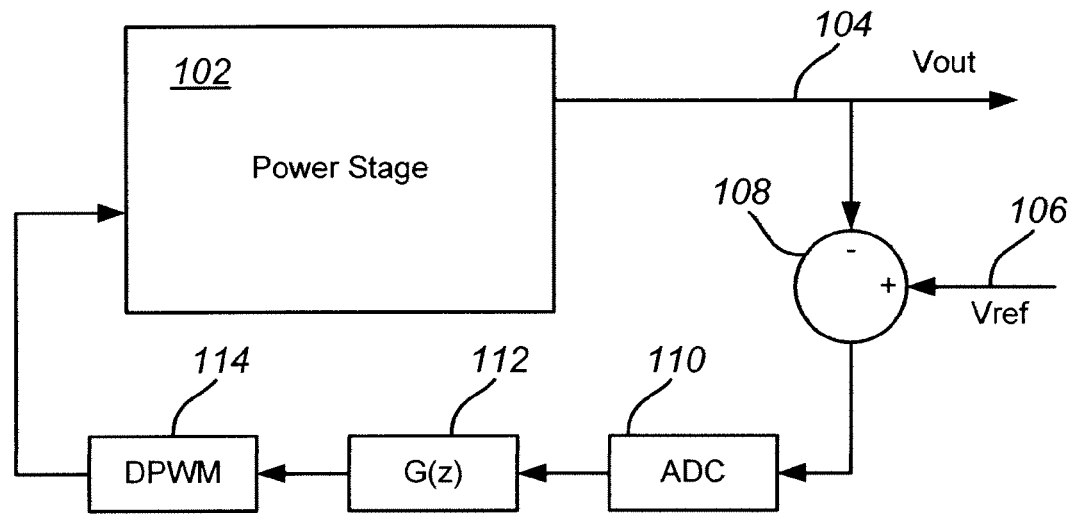
FIG. 1 is a block diagram of a typical power converter of the prior art controlled by digital PWM circuit.
Figure 2:
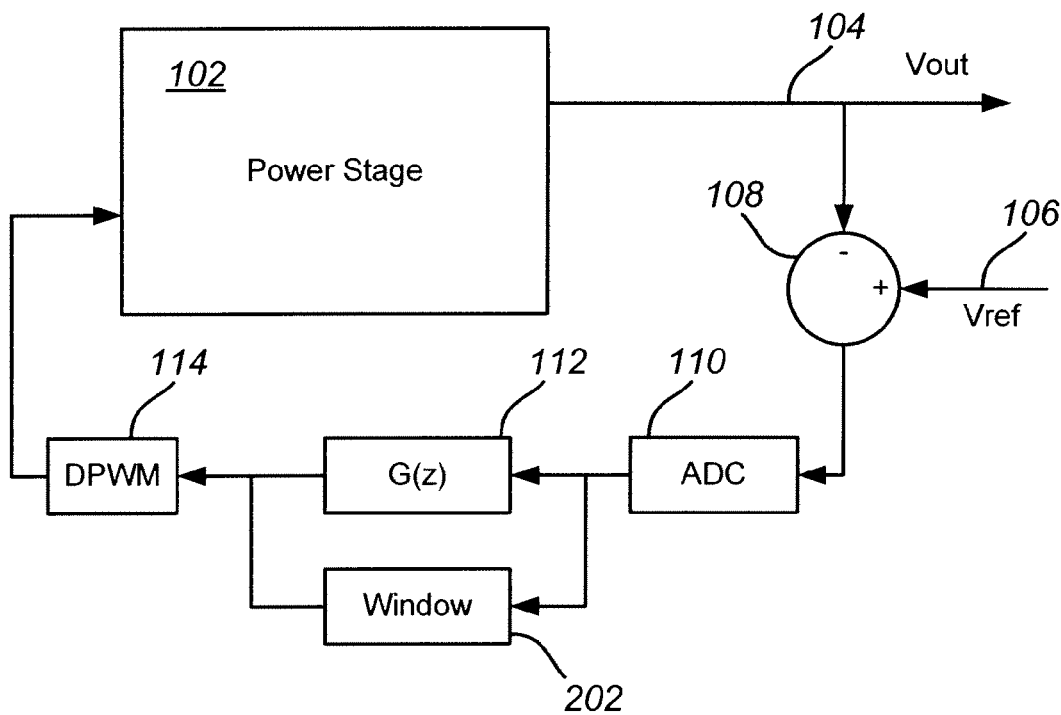
FIG. 2 is a block diagram of a non-linear control approach of the prior art that employs a window comparator.
Figure 3A:
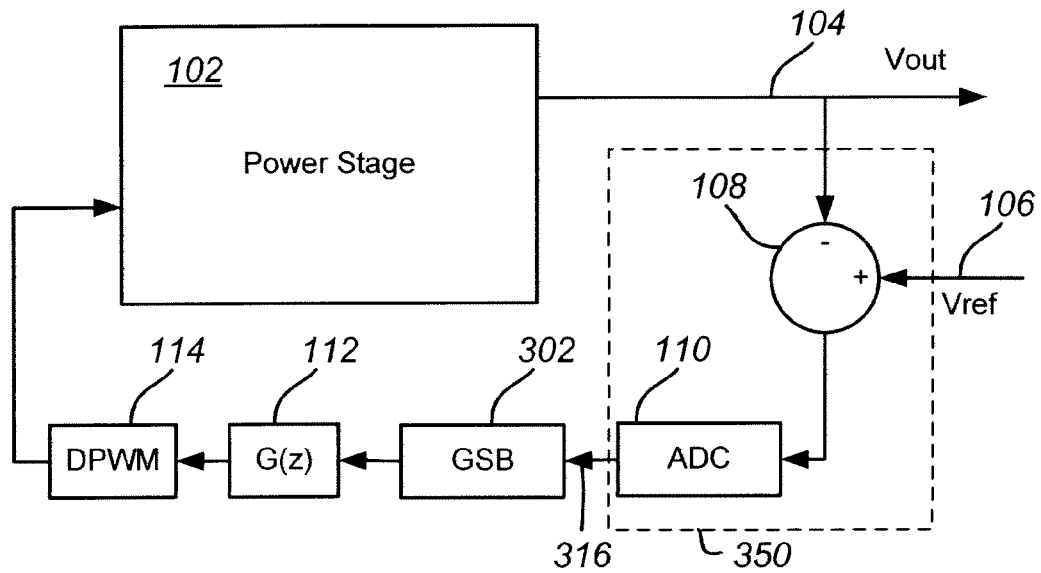
FIGS. 3a and 3b are a block diagrams of power converters controlled by digital PWM circuits wherein the system employs non-linear gain scheduling in accordance with alternative embodiments of the present invention.

An embodiment of a digital PWM control system in accordance with the present invention is illustrated in FIG. 3a and introduces a non-linear gain scheduling block (GSB) 302 into the control loop. The output 104 of the power stage 102 is fed into an error comparison circuit 108 that calculates an error signal based on the difference between the power stage output 104 and a reference voltage 106. The error signal is digitized by an ADC 110 to create a digital error signal 316. The combination of the error comparison signal 108 and the ADC 110 is identified as the error sampling block 350. The digital error signal 316 is then fed to a gain scheduling block 302 that applies a non-linear input-to-output characteristic, described in further detail below, to the digitized error signal. The processed error signal is then fed through a compensator filter 112, which may have a standard PID character, that in turn drives a digital PWM controller 114 that controls the switching of the power stage 102.

In one embodiment of a digital PWM control system in accordance with the present invention, the compensator filter 112 has a response function that is described as follows:

$$d[n]=d[n-1]+b0*e[n]-b1*e[n-1]+b2*e[n-2],$$

where d[n] refers to an output sample from the compensator filter, e[n] refers to an input sample to the compensator filter, and b0, b1, and b2 are filter coefficients that are selected depending on the particular performance requirements of the system. In some embodiments, the filter coefficients may be programmable in order to add design flexibility.

Figure 3B:
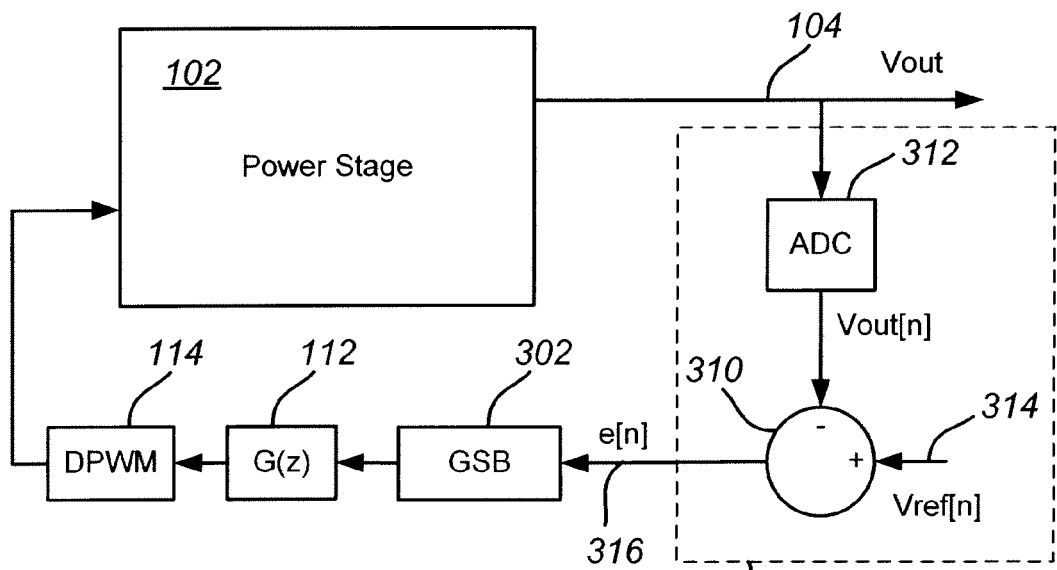

Of course, other topologies of the PWM control loop are also possible and would fall within the scope and spirit of the present invention. For example, FIG. 3b illustrates an alternative embodiment of a PWM control system in accordance with the present invention that performs the error subtraction operation in the digital domain. In this embodiment, the error sampling block 360 comprises an ADC 312 and a digital error comparison circuit 310. The output 104 of the power stage is digitized by the ADC 312, and the digital output of the ADC is then compared with a digital reference 314 in the digital error comparison circuit 310 to create a digital error signal 316 that is then processed by the gain scheduling block 302. The combination of the error comparison block 310 and the ADC 312 is referred to herein as the error sampling block and may be configured as shown in FIG. 3a, wherein the error term is calculated in the analog domain, or as shown in FIG. 3b, wherein the error term is calculated in the digital domain. Other variations of the control loop topology should be readily apparent to one skilled in the art and would similarly fall within the scope and spirit of the present invention.

Figure 4:
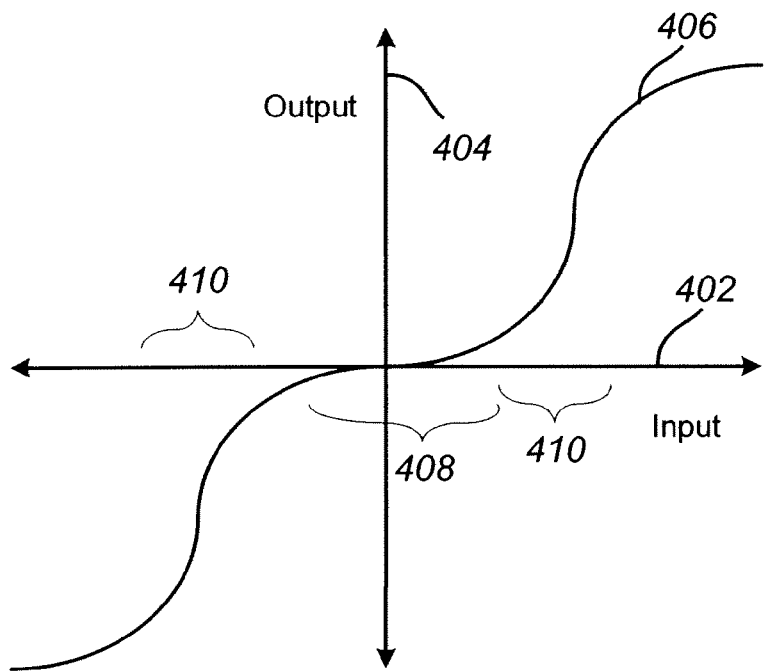
FIG. 4 is a plot of output gain as a function of input signal amplitude for a gain scheduling block in accordance with an embodiment of the present invention.

FIG. 4 depicts the general response character of an embodiment of the gain scheduling block in accordance with the present invention. The input level to the gain scheduling block is shown along horizontal axis 402, while the output level is shown along the vertical axis 404. The gain response curve 406 has a non-linear character with a low gain in the region 408 around the steady-state operating point and a large gain in the regions 410 that are further away from the steady-state operating point. Essentially, the gain increases slowly with amplitude for low signal amplitudes, increases quickly with amplitude for medium-range amplitudes, and then increases slowly again for large signal amplitudes. The small gain near the operating point assures the stability of the system and minimizes its susceptibility to oscillations and noise-induced jittering, while the large gain at medium amplitudes out provides a fast response time. The gain roll-off at large signal amplitudes simulates gain saturation.

Figure 5:
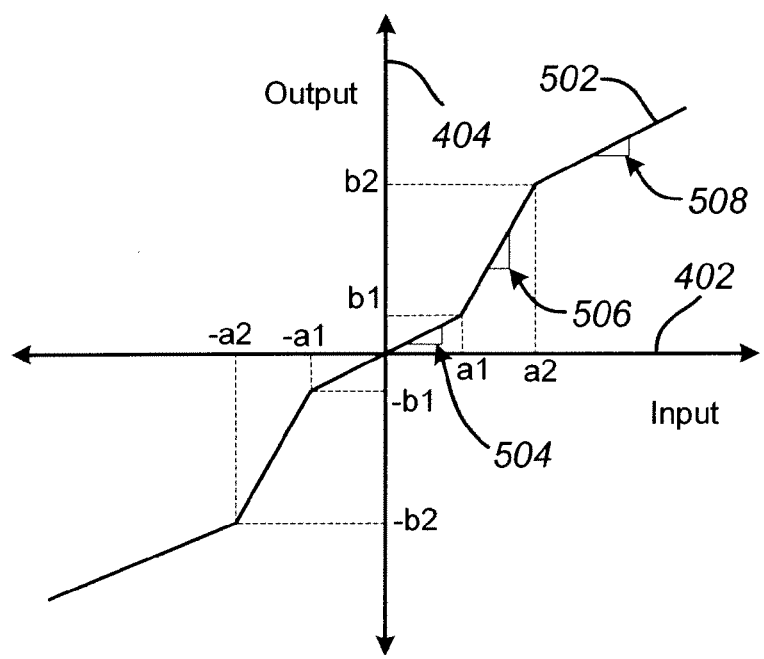
FIG. 5 is a plot of output gain as a function of input signal amplitude for a gain scheduling block in accordance with an alternative embodiment of the present invention

A practical implementation of a response curve for a gain scheduling block in accordance with an embodiment of the present invention is depicted in FIG. 5. In this implementation, a piecewise linear response curve 502 is provided that has the general characteristics of the curve depicted in FIG. 4 but is also simple to implement in a digital system. Response curve 502 is described by three different slopes: α1, depicted at 504, α2, depicted at 506, and α3, depicted at 508. The response function, f(e), can be described in terms of error input amplitude, e, as follows:

$$f(e) = \alpha 1 * e, \qquad |e| < a1;$$
$$= b1 + \alpha 2 * (e - a1), \quad a2 \geq e \geq a1;$$
$$= -b1 + \alpha 2 * (e + a1), \quad -a1 \geq e \geq -a2;$$
$$= b2 + \alpha 3 * (e - a2), \quad e \geq a2;$$
$$= -b2 + \alpha 3 * (e + a2), \quad e \leq -a2;$$

where a1, b1, a2, and b2 are the Cartesian coordinates of the points at which the slope changes, as indicated in FIG. 5. The slope α1 is chosen to provide small gain when the output of the ADC is near the steady-state operating point. As the ADC output moves further away from the equilibrium point, the slope increases to α2 and then flattens out again to α3.

Referring to FIG. 3a, we may use small signal analysis and assume a sinusoidal signal at the input to the ADC 110 to calculate an expression for the gain, G(a), through the gain scheduling block 302 as a function of the input signal amplitude, a. Using the gain scheduling curve depicted in FIG. 5, the gain can be expressed as follows for the three regions comprising a≦a1, a1≦a≦a2, and a2≦a.

$$G(a) = \alpha 1, \ a \leq a1;$$

$$= \left[ \alpha 1 + (\alpha 2 - \alpha 1) \times \frac{1}{2}\left(2 - \frac{4}{\pi}\arcsin\left(\frac{a1}{a}\right) + \frac{2}{\pi}\sin\left(2\arcsin\left(\frac{a1}{a}\right)\right)\right) - (\alpha 2 - \alpha 1) \times \frac{a1}{a} \times \frac{4}{\pi}\cos\left(\arcsin\left(\frac{a1}{a}\right)\right) \right],$$

$$a1 \leq a \leq a2;$$

$$= \left[ \begin{array}{c} \alpha 1 + (\alpha 2 - \alpha 1) \times \frac{1}{2}\left(2 - \frac{4}{\pi}\arcsin\left(\frac{a1}{a}\right) + \frac{2}{\pi}\sin\left(2\arcsin\left(\frac{a1}{a}\right)\right)\right) - \\ (\alpha 2 - \alpha 1) \times \frac{a1}{a} \times \frac{4}{\pi}\cos\left(\arcsin\left(\frac{a1}{a}\right)\right) + (\alpha 3 - \alpha 2) \times \\ \frac{1}{2}\left(2 - \frac{4}{\pi}\arcsin\left(\frac{a2}{a}\right) + \frac{2}{\pi}\sin\left(2\arcsin\left(\frac{a2}{a}\right)\right)\right) - \\ (\alpha 3 - \alpha 2) \times \frac{a2}{a} \times \frac{4}{\pi}\cos\left(\arcsin\left(\frac{a2}{a}\right)\right) \end{array} \right],$$

$$a2 \leq a.$$

Figure 6:
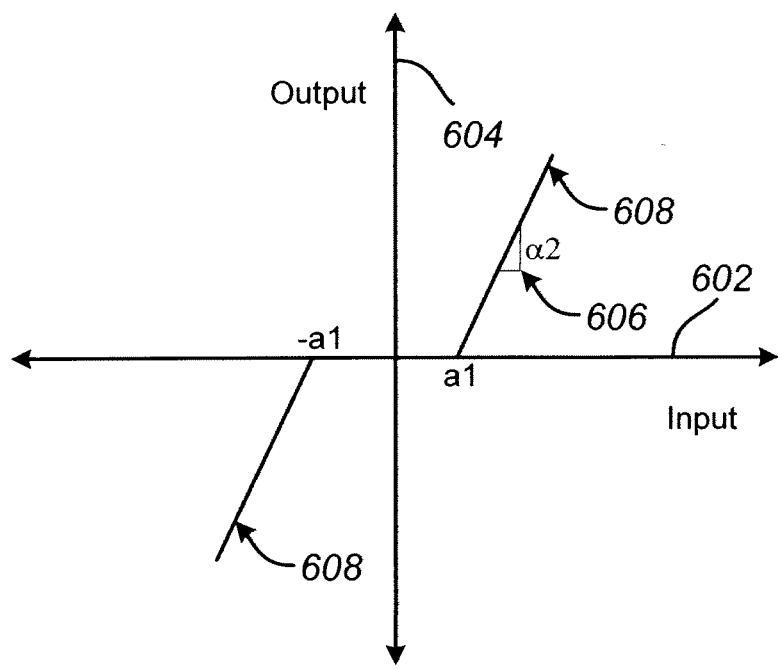
FIG. 6 is a plot representing an alternative embodiment of a gain scheduling block in accordance with the present invention.

FIG. 6 is a simplified gain scheduling scheme in accordance with another embodiment of the present invention. Input to the gain scheduling block is plotted along horizontal axis 602, and output is plotted along vertical axis 604. In this embodiment, gain curve 608 provides no sensitivity in the range extending from −a1 to +a1 and thus models the zero-error bin effect. Beyond input magnitudes of a1, the slope of the gain curve 608 increases to α2, as indicated at 606, providing a normal transient response in the case of large transients.

Figure 7:
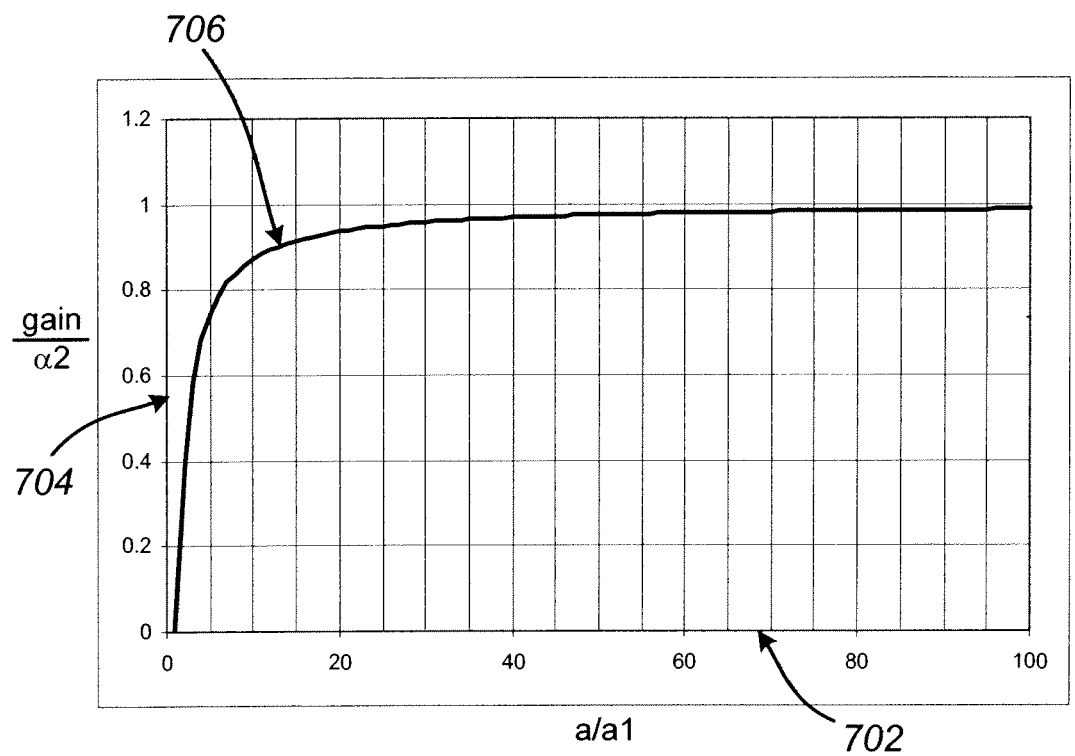
FIG. 7 is a plot of normalized gain as a function of input signal amplitude for the gain scheduling block embodiment illustrated in FIG. 6.

FIG. 7 is a plot of the gain produced by the gain scheduling scheme of FIG. 6 as a function of input amplitude. The input amplitude, normalized to a1, the point at which the gain slope switches to α2, is plotted along horizontal axis 702. The gain, normalized to α2, is plotted along vertical axis 704. The gain curve 706 illustrates very low gain in the zero-error bin, rising rapidly to α2 at amplitudes beyond a1.

Figure 8:
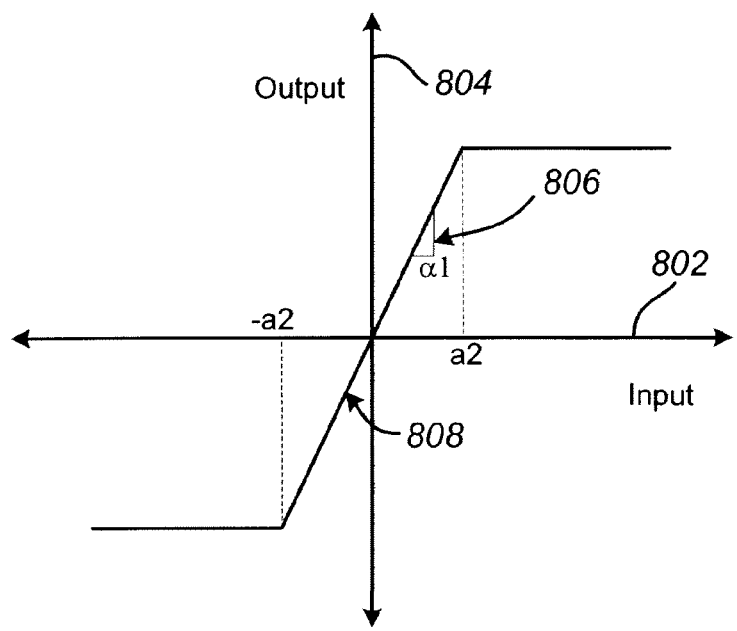
FIG. 8 is a plot representing another alternative embodiment of a gain scheduling block in accordance with the present invention.

FIG. 8 is a second simplified gain scheduling scheme in accordance with another embodiment of the present invention. Input to the gain scheduling block is plotted along horizontal axis 802, and output is plotted along vertical axis 804. The gain scheduling curve 808 has a slope of α1, indicated at 806, in the region between amplitude inputs of −a2 and +a2, and then flattens to a slope of zero beyond a2. This scheme models the gain saturation effect inherent in most digital systems.

Figure 9:
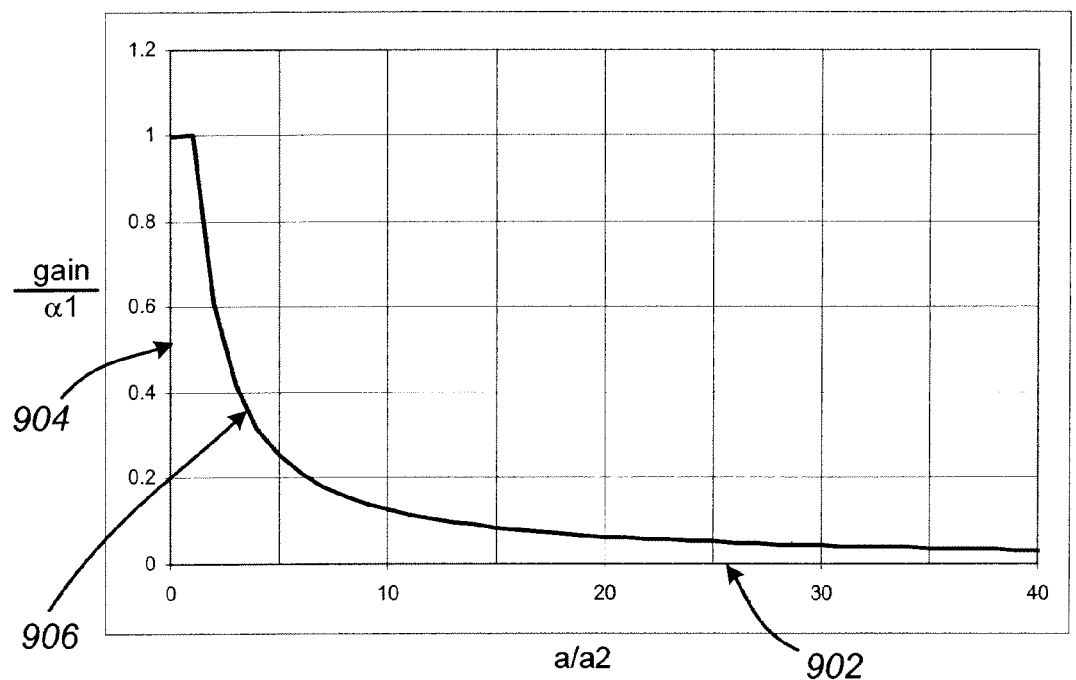
FIG. 9 is a plot of normalized gain as a function of input signal amplitude for the gain scheduling block embodiment illustrated in FIG. 8.

FIG. 9 is a plot of the gain produced by the gain scheduling scheme of FIG. 8. Input amplitude, normalized to a2, is plotted along horizontal axis 902, while gain, normalized to α1 is plotted along vertical axis 904. Gain curve 906 shows a constant gain of α1 out to amplitudes of a2, and then decays quickly beyond a2, exhibiting the saturation effect.

Figure 10:
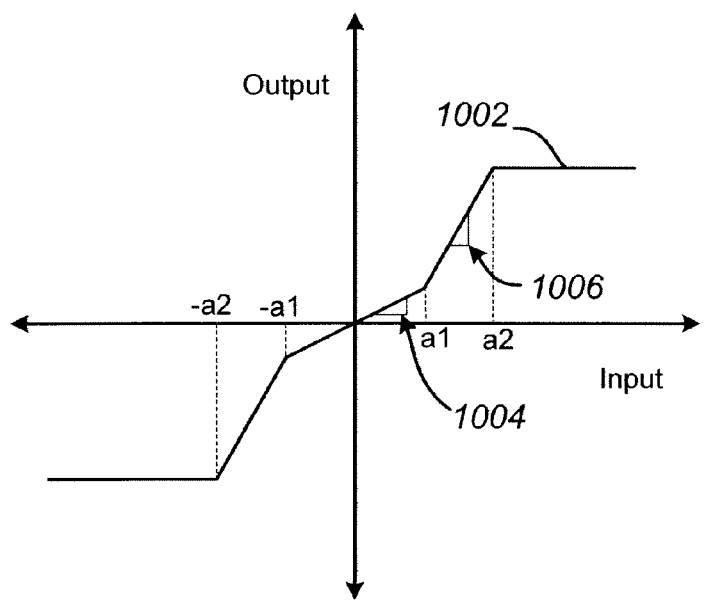
FIG. 10 is a plot representing yet another alternative embodiment of a gain scheduling block in accordance with the present invention.

FIG. 10 depicts a gain scheduling scheme in accordance with an embodiment of the present invention that exhibits a saturation effect while also introducing a reduced gain scheduling region near the steady-state operating point. In this embodiment, gain scheduling curve 1002 has a slope of 1, indicated at 1004, in the region between −a1 and +a1. The slope then increases to 2 between a1 and a2, as indicated at 1006, and then flattens off to zero beyond a2. This embodiment produces a slow response around the steady-state point to make the closed loop less sensitive to noise and to guarantee stability. At larger amplitudes, the higher gain provides large corrective action, making the transient response to large-magnitude variations significantly faster.

Figure 11:
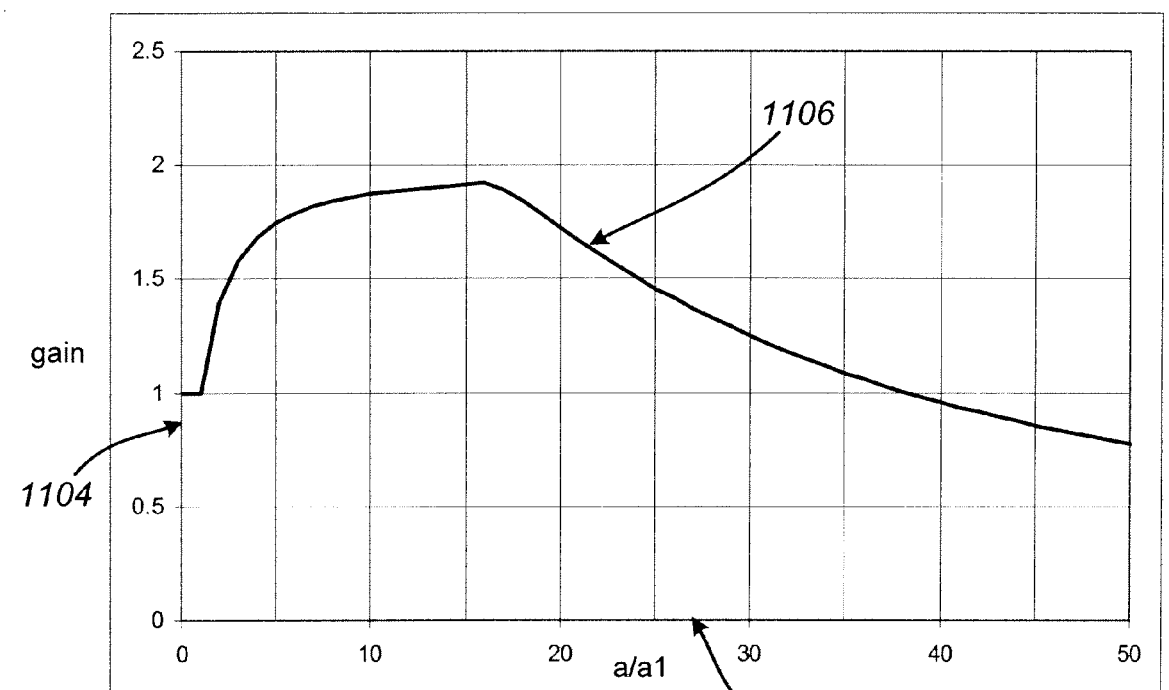
FIG. 11 is a plot of normalized gain as a function of input signal amplitude for the gain scheduling block embodiment illustrated in FIG. 10.

FIG. 11 is a gain plot of the gain scheduling scheme depicted in FIG. 10. Input amplitude, normalized to a1, is plotted along horizontal axis 1102, and gain is plotted along vertical axis 1104. In this particular plot, the ratio of a2 to a1 is taken to be 16, but other ratios may be used, depending on the desired response characteristic. The gain curve 1106 shows a flat gain of one up to a1, then a rapidly rising gain that approaches two as the amplitude approaches a2. The gain then decays at amplitudes beyond a2, illustrating the effects of saturation. It can be seen that gain curve 1106 exhibits a relatively low gain response near the steady-state point at small error amplitudes but that it increases for larger error amplitudes, providing a faster transient response.

Figure 12:
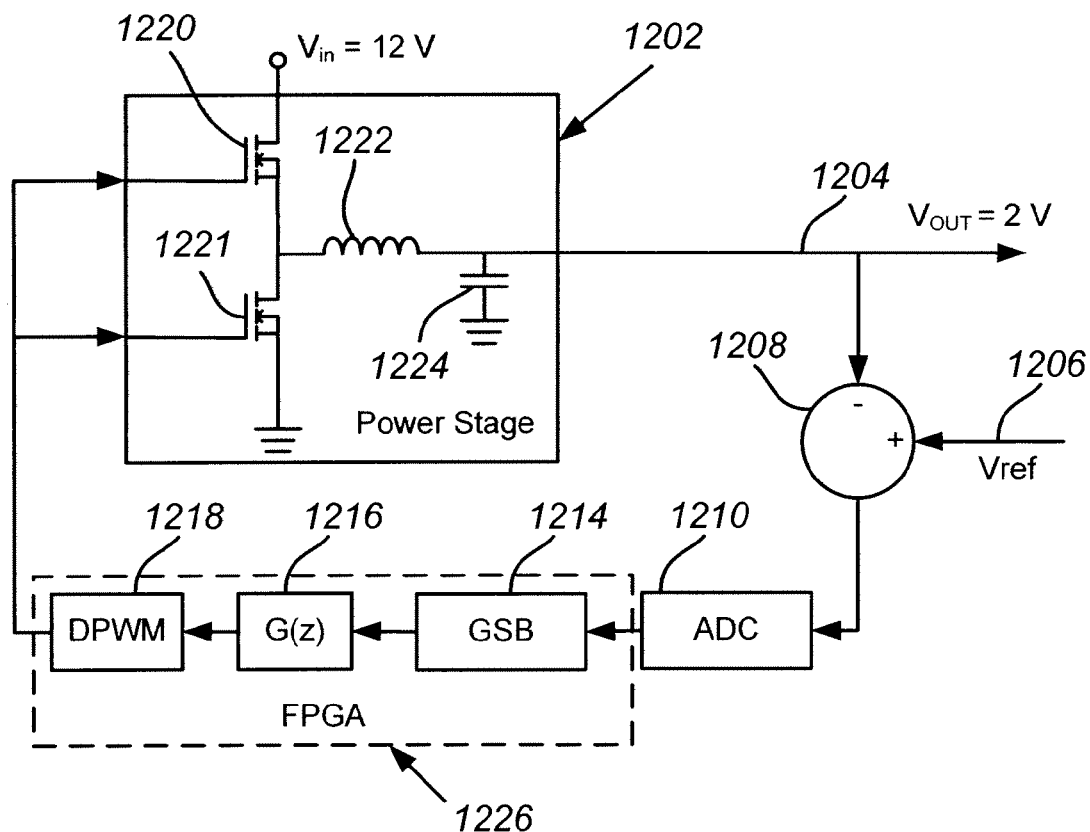
FIG. 12 is a block diagram of a digital pulse-width modulated power converter in accordance with an embodiment of the present invention.

FIG. 12 illustrates a digital PWM control circuit in accordance with an embodiment of the present invention that was constructed using a field-programmable gate array (FPGA) to control a buck converter. The power stage 1202 was designed as a switching converter having switch elements 1220 and 1221 and a filter element comprising inductor 1222 and capacitor 1224. The switching converter was designed to deliver 2 volts output from a 12 volt input supply. In this embodiment, inductor 1222 has a value of L=1.4 μH and capacitor 1224 has a value of C=630 μF. The error signal, calculated at block 1208 from the difference of output voltage 1204 and reference voltage 1206, was digitized in an ADC 1210 having 9 bits of resolution and a least-significant bit size of 0.5 mV. The gain scheduling scheme 1214 and compensator filter 1216 were implemented in an FPGA 1226 to control a digital PWM control circuit 1218 clocked at 200 MHz and having a switching frequency of 500 kHz. The digital compensator 1216 was implemented to have the following response function:

$$G(z) = 1.5 \frac{\left(z - \frac{7}{8}\right)\left(z - \frac{31}{32}\right)}{z(z-1)}.$$

Figure 13A:
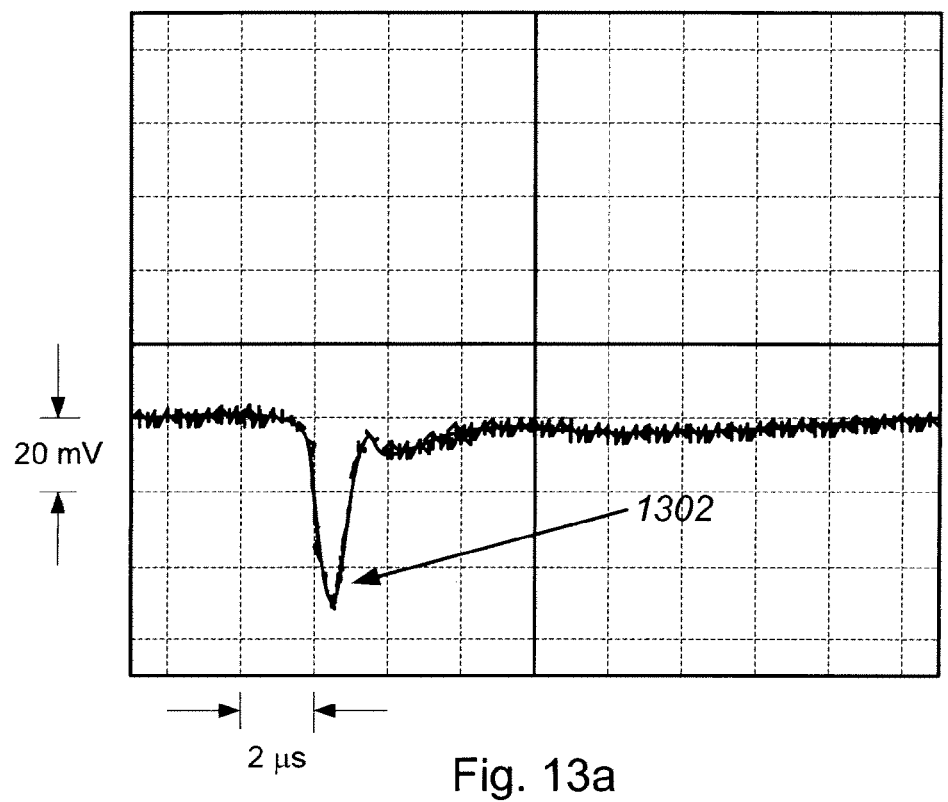
FIG. 13a is a plot of the measured transient response of an exemplary power converter system employing no gain scheduling.
Figure 13B:
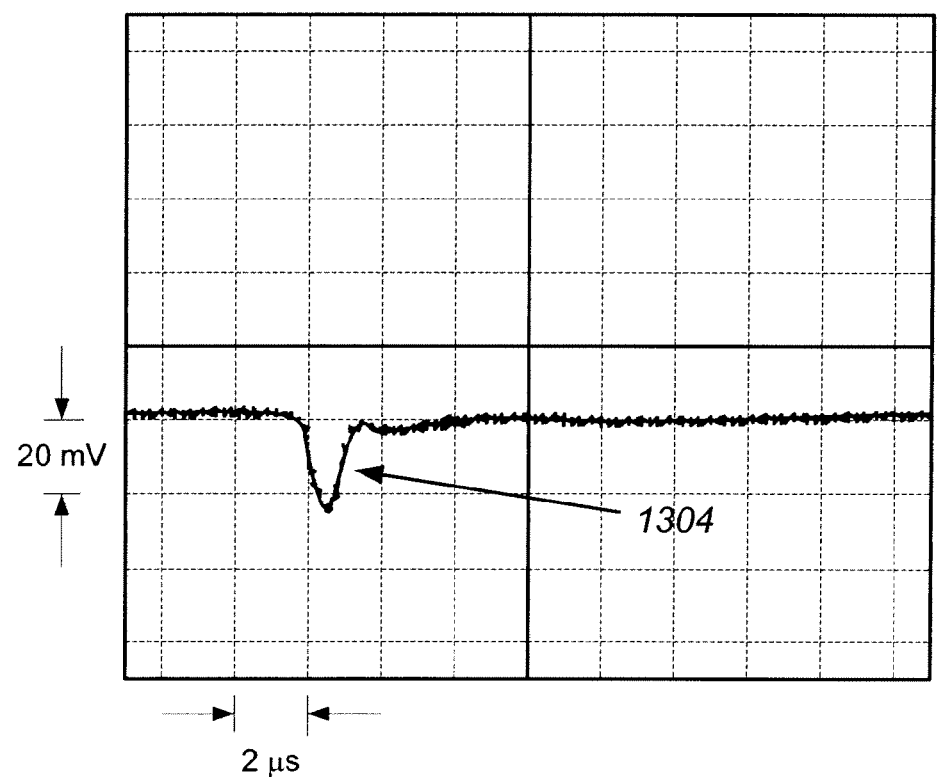
FIG. 13b is a plot of the measured transient response of an exemplary power converter system employing gain scheduling in accordance with an embodiment of the present invention.

FIG. 13a illustrates the transient response of this system when no gain scheduling scheme is employed. FIG. 13b illustrates the transient response when the gain scheduling scheme is employed in the manner illustrated in FIG. 10. It can be seen that the size of the transient spike 1302 in the case with no gain scheduling is significantly larger than the transient spike 1304 when gain scheduling is employed.

From the analysis of the gain scheduling schemes presented previously, it is clear that the gain through the scheduling block can be very small when there is a saturation effect or zero-error bin effect. In fact, the saturation effect almost always exists inherently in digitally controlled PWM systems. For example, the digital PWM controller itself is limited to duty cycles between 0% and 100%. This saturation effect introduces a small gain into the closed-loop system that must be taken into account during stability analysis. The following simulation was undertaken to demonstrate this analysis.

A digitally controlled boost converter was simulated with parameters including L=5 µH, C=60 µF, Vin=5 V, and Vout=10 V, with a switching frequency of 500 kHz and a load resistance of 11.6Ω. The compensator filter was designed to have the following response function:

$$G(z) = 6.03 \frac{(z-0.954)(z-0.766)}{z(z-1)}$$

With this gain function, the system is stable. Modeling this system using Simulink reveals a gain margin of 8.46 dB and a phase margin of 20 degrees, indicating stability. However, if the gain term is decreased, the system becomes unstable due to the small gain introduced by the saturation of the DPWM. For example, a system was simulated having the following smaller gain:

$$G(z) = 0.121 \frac{(z-0.954)(z-0.766)}{z(z-1)}$$

The simulation of this system showed a gain margin of −16.8 dB and a phase margin of −16.8 degrees, indicating that it was not stable. Thus, it is important to address the stability problem when small gains are involved.

In summary, the foregoing description of several embodiments of a digital PWM control system achieves a number of advantages over the prior art. For example, a non-linear response function can be achieved without the need for a window comparator. Several practical piecewise-linear implementations of the gain scheduling scheme are illustrated that are easily implemented in the digital domain and introduce nonlinearity into the DPWM system naturally. The gain scheduling method enables a slow response around the steady-state point, which makes the loop less sensitive to noise and guarantees stability. At the same time, it enables high gain at larger amplitudes such that a large corrective response is applied to large transients, making the transient response significantly faster. Other advantages and applications of the present invention will be clear to those skilled in the art and would also fall within the scope and spirit of the present invention. The invention is solely defined by the following claims.

What is claimed is:

1. A digital pulse-width modulation (DPWM) control system comprising:
a power stage for converting voltage comprising:
an input voltage port;
an output voltage port; and
an input control port for receiving a DPWM control waveform;
an error sampling block operatively coupled to the output voltage port of the power stage and comprising:
an analog-to-digital converter; and
an error comparison circuit;
wherein the error sampling block is adapted to output a digitized error signal representing a voltage difference between the output voltage of the power stage and a reference voltage;
a gain scheduling block adapted to apply a non-linear gain to the digitized error signal from the error comparison circuit to produce a gain-scheduled error signal;
a compensator filter for filtering the gain-scheduled error signal; and
a digital PWM module configured to receive the filtered gain-scheduled error signal and to output a DPWM control waveform that is operatively coupled to the input control port of the power stage; wherein the gain scheduling block is further adapted to apply a non-linear gain having a profile that:
increases slowly with input amplitude for small input amplitudes;
increases quickly with input amplitude for medium input amplitudes; and
increases slowly with input amplitude for large input amplitudes.

2. The DPWM control system of claim 1, wherein the power stage is further adapted to include a power switching element and a filter element;
wherein the filter element is operatively coupled to the output voltage port; and
wherein the power switching element is adapted to selectively connect the input voltage port to the filter element.

3. The DPWM control system of claim 1, wherein error sampling block is further configured such that:
the error comparison circuit performs an analog comparison of the output voltage of the power stage and the reference voltage to produce a difference voltage; and
the ADC digitizes the difference voltage to produce the digitized error signal.

4. The DPWM control system of claim 1, wherein error sampling block is further configured such that:
the ADC digitizes the output voltage of the power stage to produce a digital output voltage; and
the error comparison circuit calculates a difference between the digital output voltage and the reference voltage to produce the digitized error signal.

5. The DPWM control system of claim 1, wherein the compensator filter has a response function given by d[n]=d[n−1]+b0*e[n]−b1*e[n−1]+b2*e[n−2], wherein:
d[n] is an output of the compensator filter at a current sample time t;
d[n−1] is the output of the compensator filter a sample time t−1;
e[n] is the gain-scheduled error signal at the current sample time t;
e[n−1] is the gain-scheduled error signal at the sample time t−1;
e[n−2] is the gain-scheduled error signal at a sample time t−2;
b0 is a first filter coefficient;
b1 is a second filter coefficient; and
b2 is a third filter coefficient.

6. The DPWM control system of claim 5, wherein the first, second, and third filter coefficients are programmable.

7. A digital pulse-width modulation (DPWM) control system comprising:
- a power stage for converting voltage comprising:
  - an input voltage port;
  - an output voltage port; and
  - an input control port for receiving a DPWM control waveform;
- an error sampling block operatively coupled to the output voltage port of the power stage and comprising:
  - an analog-to-digital converter; and
  - an error comparison circuit;
  - wherein the error sampling block is adapted to output a digitized error signal representing a voltage difference between the output voltage of the power stage and a reference voltage;
- a gain scheduling block adapted to apply a non-linear gain to the digitized error signal from the error comparison circuit to produce a gain-scheduled error signal;
- a compensator filter for filtering the gain-scheduled error signal; and
- a digital PWM module configured to receive the filtered gain-scheduled error signal and to output a DPWM control waveform that is operatively coupled to the input control port of the power stage; wherein the gain scheduling block is further adapted to apply a non-linear gain having a profile that:
  - increases linearly with a slope of $\alpha 1$ for input amplitudes less than a1;
  - increases linearly with a slope of $\alpha 2$ for input amplitudes between and including a1 and a2; and
  - increases linearly with a slope of $\alpha 3$ for input amplitudes greater than a2; wherein:
    - $\alpha 1$ is less than or equal to $\alpha 2$;
    - $\alpha 2$ is greater than or equal to $\alpha 3$; and
    - a1 is less than a2.

8. A digital pulse-width modulation (DPWM) control system comprising:
- a power stage for converting voltage comprising:
  - an input voltage port;
  - an output voltage port; and
  - an input control port for receiving a DPWM control waveform;
- an error sampling block operatively coupled to the output voltage port of the power stage and comprising:
  - an analog-to-digital converter; and
  - an error comparison circuit;
  - wherein the error sampling block is adapted to output a digitized error signal representing a voltage difference between the output voltage of the power stage and a reference voltage;
- a gain scheduling block adapted to apply a non-linear gain to the digitized error signal from the error comparison circuit to produce a gain-scheduled error signal;
- a compensator filter for filtering the gain-scheduled error signal; and
- a digital PWM module configured to receive the filtered gain-scheduled error signal and to output a DPWM control waveform that is operatively coupled to the input control port of the power stage; wherein the gain scheduling block is further adapted to apply a non-linear gain having a profile that:
  - is equal to zero for input amplitudes less than a1; and
  - increases linearly for input amplitudes greater than or equal to a1.

9. A digital pulse-width modulation (DPWM) control system comprising:
- a power stage for converting voltage comprising:
  - an input voltage port;
  - an output voltage port; and
  - an input control port for receiving a DPWM control waveform;
- an error sampling block operatively coupled to the output voltage port of the power stage and comprising:
  - an analog-to-digital converter; and
  - an error comparison circuit;
  - wherein the error sampling block is adapted to output a digitized error signal representing a voltage difference between the output voltage of the power stage and a reference voltage;
- a gain scheduling block adapted to apply a non-linear gain to the digitized error signal from the error comparison circuit to produce a gain-scheduled error signal;
- a compensator filter for filtering the gain-scheduled error signal; and
- a digital PWM module configured to receive the filtered gain-scheduled error signal and to output a DPWM control waveform that is operatively coupled to the input control port of the power stage; wherein the gain scheduling block is further adapted to apply a non-linear gain having a profile that:
  - increases linearly with a slope of $\alpha 1$ for input amplitudes less than a1; and
  - remains constant at a gain of $\alpha 1 * a1$ for amplitudes greater than or equal to a1.

10. A power conversion system comprising:
- a switching converter comprising:
  - an input voltage port;
  - an output voltage port;
  - an output filter operatively connected to the output voltage port; and
  - a switch element for selectively connecting the input voltage port to the output filter;
- an error circuit adapted to produce a voltage corresponding to a difference between the output voltage of the switching converter and a reference voltage;
- an analog-to-digital converter (ADC) adapted to digitize the difference voltage produced by the error circuit to produce a digital error sample;
- a gain scheduling block adapted to scale the digital error sample by a non-linear gain function to produce a gain-scheduled error signal, wherein the non-linear gain function comprises a piecewise linear function having at least a first slope and a second slope, wherein the non-linear gain function increases slowly with input amplitude for small input amplitudes, increases quickly with input amplitude for medium input amplitudes, and increases slowly with input amplitude for large input amplitudes;
- a compensator filter for filtering the gain-scheduled error signal; and
- a digital pulse width modulation module configured to receive the filtered gain-scheduled error signal and to generate a control waveform that is operatively coupled to the switch element of the switching converter.

11. The power conversion system of claim 10, wherein the second slope of the piecewise linear function of the gain scheduling block is greater than the first slope of the piecewise linear function of the gain scheduling block.

12. The power conversion system of claim 11, wherein the first slope of the piecewise linear function of the gain scheduling block is equal to zero.

13. The power conversion system of claim 10, wherein the piecewise linear function of the gain scheduling block further includes a third slope such that the first slope is less than the second slope and the third slope is less than the second slope.

14. The power conversion system of claim 10, wherein the compensator filter has a response function given by d[n]=d[n−1]+b0*e[n]−b1*e[n−1]+b2*e[n−2], wherein:
   d[n] is an output of the compensator filter at a current sample time t;
   d[n−1] is the output of the compensator filter a sample time t−1;
   e[n] is the gain-scheduled error signal at the current sample time t;
   e[n−1] is the gain-scheduled error signal at the sample time t−1;
   e[n−2] is the gain-scheduled error signal at a sample time t−2;
   b0 is a first filter coefficient;
   b1 is a second filter coefficient; and
   b2 is a third filter coefficient.

15. The DPWM control system of claim 14, wherein the first, second, and third filter coefficients are programmable.

16. In a digital pulse-width-modulator-controlled power system including a switching power converter, an analog-to-digital converter, a compensator filter, and a digital pulse-width modulator, a method of controlling an output voltage of the switching power converter comprises the steps of:
   comparing the output voltage of the switching power converter to a reference voltage to create a difference error signal;
   digitizing the difference error signal with the analog-to-digital converter to create a plurality of digital error samples;
   applying a non-linear gain scheduling function to the plurality of digital error samples to produce a plurality of gain-scheduled error samples;
   filtering the plurality of gain-scheduled error samples to produce a pulse-width-modulator driving signal;
   driving the digital pulse width modulator with the pulse-width modulator driving signal to produce a switching waveform; and
   operatively coupling the switching waveform to the switching power converter;
   wherein the output voltage of the switching power converter is controlled such that it tracks the reference voltage; and wherein the step of applying a non-linear gain scheduling function to the plurality of digital error samples further comprises:
      applying a gain that increases linearly with a slope of α1 to ones of the plurality of error samples having amplitudes less than a1;
      applying a gain that increases linearly with a slope of α2 to ones of the plurality of error samples having amplitudes between and including a1 and a2; and
      applying a gain that increases linearly with a slope of α3 to ones of the plurality of error samples having amplitudes greater than a2, wherein:
         α1 is less than or equal to α2;
         α2 is greater than or equal to α3; and
         a1 is less than a2.

17. The method of controlling an output voltage of the switching power converter of claim 16, wherein the step of filtering the plurality of gain-scheduled error samples further includes applying a response function characterized by d[n]=d[n−1]+b0*e[n]−b1*e[n−1]+b2*e[n−2], wherein:
   d[n] is the pulse-width modulator driving signal at a current sample time t;
   d[n−1] is the pulse-width modulator driving signal at sample time t−1;
   e[n] is the gain-scheduled error sample at the current sample time t;
   e[n−1] is the gain-scheduled error sample at the sample time t−1;
   e[n−2] is the gain-scheduled error sample at a sample time t−2;
   b0 is a first filter coefficient;
   b1 is a second filter coefficient; and
   b2 is a third filter coefficient.

18. In a digital pulse-width-modulator-controlled power system including a switching power converter, an analog-to-digital converter, a compensator filter, and a digital pulse-width modulator, a method of controlling an output voltage of the switching power converter comprises the steps of:
   comparing the output voltage of the switching power converter to a reference voltage to create a difference error signal;
   digitizing the difference error signal with the analog-to-digital converter to create a plurality of digital error samples;
   applying a non-linear gain scheduling function to the plurality of digital error samples to produce a plurality of gain-scheduled error samples;
   filtering the plurality of gain-scheduled error samples to produce a pulse-width-modulator driving signal;
   driving the digital pulse width modulator with the pulse-width modulator driving signal to produce a switching waveform; and
   operatively coupling the switching waveform to the switching power converter;
   wherein the output voltage of the switching power converter is controlled such that it tracks the reference voltage; and wherein the step of applying a non-linear gain scheduling function to the plurality of digital error samples further comprises:
      applying a gain of zero to ones of the plurality of error samples having amplitudes less than a1; and
      applying a gain that increases linearly to ones of the plurality of error samples having amplitudes greater than or equal to a1.

19. In a digital pulse-width-modulator-controlled power system including a switching power converter, an analog-to-digital converter, a compensator filter, and a digital pulse-width modulator, a method of controlling an output voltage of the switching power converter comprises the steps of:
   comparing the output voltage of the switching power converter to a reference voltage to create a difference error signal;
   digitizing the difference error signal with the analog-to-digital converter to create a plurality of digital error samples;
   applying a non-linear gain scheduling function to the plurality of digital error samples to produce a plurality of gain-scheduled error samples;
   filtering the plurality of gain-scheduled error samples to produce a pulse-width-modulator driving signal;
   driving the digital pulse width modulator with the pulse-width modulator driving signal to produce a switching waveform; and
   operatively coupling the switching waveform to the switching power converter;
   wherein the output voltage of the switching power converter is controlled such that it tracks the reference voltage; and wherein the step of applying a non-linear gain scheduling function to the plurality of digital error samples further comprises:

applying a gain that increases linearly with a slope of $\alpha 1$ to ones of the plurality of error samples having amplitudes less than a1; and applying a constant gain equal to $\alpha 1 * a1$ to ones of the plurality of error samples having amplitudes less than a1.

\* \* \* \* \*